(12) United States Patent
Kang et al.

(10) Patent No.: US 8,888,082 B2
(45) Date of Patent: Nov. 18, 2014

(54) MOUNT BUSHING OF STABILIZER BAR FOR VEHICLE

(75) Inventors: Hee Gon Kang, Anyang (KR); Daewon Jang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 91 days.

(21) Appl. No.: 13/490,095

(22) Filed: Jun. 6, 2012

(65) Prior Publication Data

US 2013/0028543 A1 Jan. 31, 2013

(30) Foreign Application Priority Data

Jul. 29, 2011 (KR) ........................ 10-2011-0076226

(51) Int. Cl.
*B60G 21/055* (2006.01)
*B60G 11/22* (2006.01)

(52) U.S. Cl.
CPC ........ *B60G 21/0551* (2013.01); *B60G 2204/41* (2013.01); *B60G 2204/1222* (2013.01)
USPC .................... 267/294; 267/141; 280/124.107; 384/285

(58) Field of Classification Search
CPC ........... B60G 21/0551; B60G 2204/41; B60G 2204/1222
USPC ........... 267/292, 293, 140, 140.3, 140.4, 141; 384/285
See application file for complete search history.

(56) References Cited

U.S. PATENT DOCUMENTS

| 4,916,749 | A | * | 4/1990 | Urban et al. | 384/298 |
| 5,013,166 | A | * | 5/1991 | Domer | 384/220 |
| 5,141,339 | A | * | 8/1992 | Evans | 384/130 |
| 5,263,778 | A | * | 11/1993 | Jordens et al. | 384/140 |
| 5,352,044 | A | * | 10/1994 | Jordens et al. | 384/140 |
| 5,520,465 | A | * | 5/1996 | Kammel | 384/220 |
| 6,170,812 | B1 | * | 1/2001 | Nicoles | 267/281 |
| 6,474,631 | B2 | * | 11/2002 | Hadano et al. | 267/276 |
| 2003/0057622 | A1 | * | 3/2003 | Bovio et al. | 267/281 |

FOREIGN PATENT DOCUMENTS

| JP | 2004-67094 A | 3/2004 |
| JP | 3973041 B2 | 6/2007 |
| JP | 4160178 B2 | 7/2008 |

* cited by examiner

*Primary Examiner* — Thomas Irvin
(74) *Attorney, Agent, or Firm* — Morgan, Lewis & Bockius LLP

(57) ABSTRACT

A mount bushing of a stabilizer bar for a vehicle includes an insert adapted to be directly molded to a predetermined position of the stabilizer bar, a sliding bearing comprising a pair of bearings and adapted to be coupled to an exterior circumference of the insert, a lubrication layer being formed between the insert and the sliding bearing, a rubber bushing comprising upper and lower rubber members and adapted to be coupled to the sliding bearing such that the rubber bushing encloses an exterior circumference of the sliding bearing, a bracket adapted to enclose the rubber bushing and to be fixed to a vehicle body, and first and second sealing means adapted to prevent foreign materials from flowing into the rubber bushing and to prevent grease in the rubber bushing from flowing out.

9 Claims, 8 Drawing Sheets

MOUNT BUSHING OF STABILIZER BAR FOR VEHICLE

CROSS-REFERENCE TO RELATED APPLICATION

The present application claims priority of Korean Patent Application Number 10-2011-0076226 filed Jul. 29, 2011, the entire contents of which application is incorporated herein for all purposes by this reference.

BACKGROUND OF INVENTION

1. Field of Invention

The present invention relates to a mount bushing of a stabilizer bar applicable to a suspension system of a vehicle. More particularly, the present invention relates to a mount bushing of a stabilizer bar for a vehicle that enhances marketability and fuel economy of the vehicle by reducing noise and friction and improves durability by preventing foreign materials and grease respectively from flowing into or flowing out.

2. Description of Related Art

A stabilizer bar of a vehicle is applied to an independent suspension system, and is a type of torsional springs that secures balance of a vehicle body by suppressing roll motion of vehicle body when the vehicle turns or drives on a rough road.

FIG. 1 is a top plan view of a suspension system for explaining structures of a conventional stabilizer bar.

Referring to FIG. 1, both ends of the stabilizer bar 2 are respectively connected to lower control arms 8 and 10 or strut assemblies 12 and 14 through control links 4 and 6.

In addition, both side portions of a middle linear portion of the stabilizer bar 2 are fixed to a sub frame 16 through mount bushings 18 and 20.

The stabilizer bar 2 described above operates as an auxiliary spring that supports left and right wheels when the vehicle body rolls. When the left and right wheels move with the same phase, a force is not applied to the stabilizer bar 2. When the left and right wheels, on the contrary, move with different phases, the stabilizer bar 2 restricts movements of the left and right wheel by torsional elastic force so as to suppress the roll of the vehicle body.

For example, the stabilizer bar 2 applies elastic force to the both wheels so as to synchronize movements of the both wheels when the vehicle turns (i.e., when the outer wheel to a turning direction bounds and the inner wheel to the turning direction rebounds). Therefore, the stabilizer bar 2 suppresses tilt of the vehicle body. On the contrary, the stabilizer bar 2 does not apply the elastic force when the both wheels move to the same direction.

In addition, the conventional mount bushing 18 and 20 that fixes the both side portions of the middle linear portion of the stabilizer bar 2 to the sub frame 16 is shown in FIG. 2 and FIG. 3.

FIG. 2A is a cross-sectional view of a mount bushing of lubrication type.

Referring to FIG. 2A, the mount bushing 18 and 20 of lubrication type includes a bracket 22 and a rubber bushing 24 to which lubrication ingredient is added, and the bracket 22 is fixed to the vehicle body or the sub frame 16 in a state of enclosing the rubber bushing 24.

The stabilizer bar 2 having a circular cross-section penetrates through and is fixed to a center portion of the rubber bushing 24. Therefore, the rubber bushing 24 reduces noise or vibration caused by movements of the stabilizer bar 2. In addition, the rubber bushing 24 affects on roll strength according to compression force to the stabilizer bar 2.

FIG. 2B is a cross-sectional view for explaining development of minute deformation of I region in FIG. 2A.

Referring to FIG. 2B, if the stabilizer bar 2 rotates by about 2°-3° in the mount bushing 18 and 20 of lubrication type, the rubber bushing 24 begins to deform and then is slipped.

If the rubber bushing 24 is slipped, noise occurs. Particularly, as the rubber bushing 24 becomes aged, the noise get louder.

FIG. 3A is a cross-sectional view of a mount bushing of double steel type.

Referring to FIG. 3A, the mount bushing 18 and 20 of double steel type like the mount bushing of lubrication type includes the bracket 22 and the rubber bushing 24, and a double steel bushing 26 is inserted in the rubber bushing 24. When the stabilizer bar 2 rotates, the mount bushing 18 and 20 of double steel type uses the double steel bushing 26 so as not to occur slip.

FIG. 3B is a cross-sectional view for explaining development of minute deformation of II region in FIG. 3A.

Referring to FIG. 3B, since slip does not occur in the mount bushing 18 and 20 of double steel type, noise problem can be solved. However, rotating torque increases proportional to a rotation of the stabilizer bar 2. Therefore, friction may increase and fuel economy may be deteriorated in a case that the vehicle moves excessively.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a mount bushing of a stabilizer bar for a vehicle having advantages of increasing marketability and fuel economy of the vehicle by using structures of a sliding bearing and reducing noise and friction, and of improving durability by preventing foreign materials from flowing into or preventing grease from flowing out.

Various aspects of the present invention provide for a mount bushing of a stabilizer bar for a vehicle that may include an insert adapted to be directly molded to a predetermined position of the stabilizer bar, a sliding bearing comprising a pair of bearings and adapted to be coupled to an exterior circumference of the insert, a lubrication layer being formed between the insert and the sliding bearing, a rubber bushing comprising upper and lower rubber members and adapted to be coupled to the sliding bearing such that the rubber bushing encloses an exterior circumference of the sliding bearing, a bracket adapted to enclose the rubber bushing and to be fixed to a vehicle body, and first and second sealing means adapted to prevent foreign materials from flowing into the rubber bushing and to prevent grease in the rubber bushing from flowing out.

The insert may be directly molded to an exterior circumference of the stabilizer bar, and is provided with inner and outer flanges of large diameter formed respectively at both ends thereof, a predetermined circumferential mound formed at a middle portion thereof, and lubrication grooves filled with lubricant formed at exterior circumferences of both sides with respect to the circumferential mound.

The sliding bearing may be made of low-friction material of Teflon family.

The sliding bearing may include a pair of bearings, is disposed at both sides with respect to the circumferential mound of the insert, and is provide with flanges for fixing the rubber bushing formed at both end portions of the sliding bearing.

Each of the bearings further may include a cut-out section formed along a length direction thereof such that each of the bearings are mounted on the insert by spreading the cut-out section.

The first sealing means may include three lips respectively formed at interior circumferences of both sides of the rubber bushing.

The lips may have circumferential mound shapes protruded so as to closely contact with the inner and outer flanges formed at the both ends of the insert.

The three lips may include a first lip closely contacting with an interior surface of a circumferential groove formed between the inner and outer flanges and adapted to perform a first sealing operation, a second lip closely contacting with an exterior circumference of the outer flange and adapted to perform a second sealing operation, and a third lip closely contacting with both ends of the insert and adapted to perform a third sealing operation.

The second sealing means may include a sealing protrusion formed at one of the upper and lower rubber members, and a sealing groove corresponding to the sealing protrusion and formed at the other of the upper and lower rubber members.

The sealing protrusion may be protruded from an upper assembling surface of the lower rubber member along a length direction thereof, and the sealing groove is formed at a lower assembling surface of the upper rubber member and is adapted to receive the sealing protrusion.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
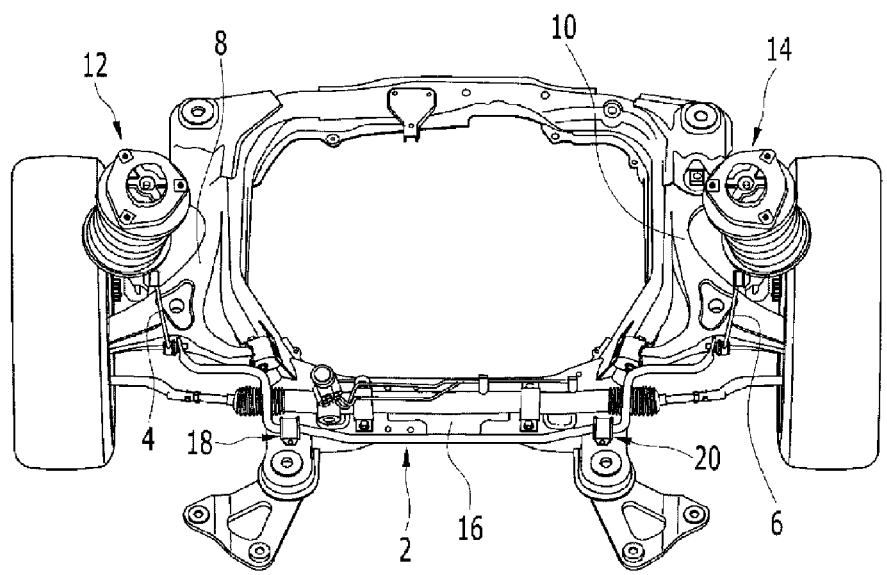
FIG. 1 is a top plan view of a suspension system for explaining structures of a conventional stabilizer bar.
Figure 2A:
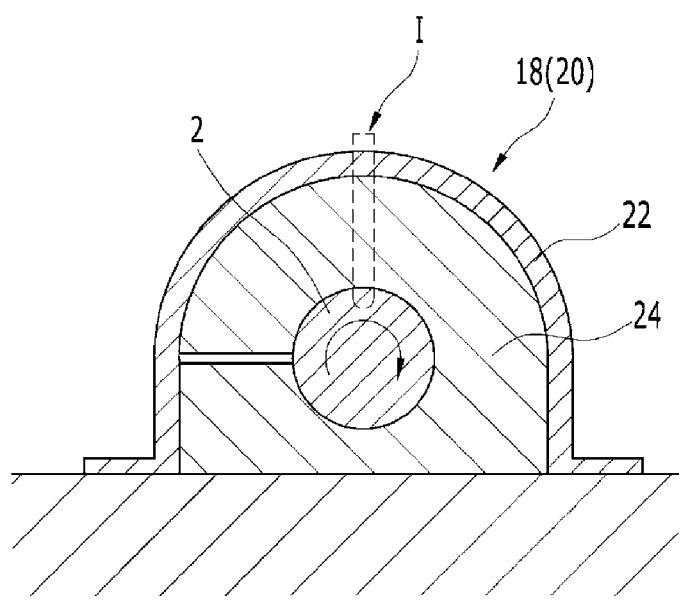
FIG. 2A and FIG. 2B are a cross-sectional view of an exemplary conventional mount bushing of a stabilizer bar and a cross-sectional view for explaining development of minute deformation.
Figure 2B:
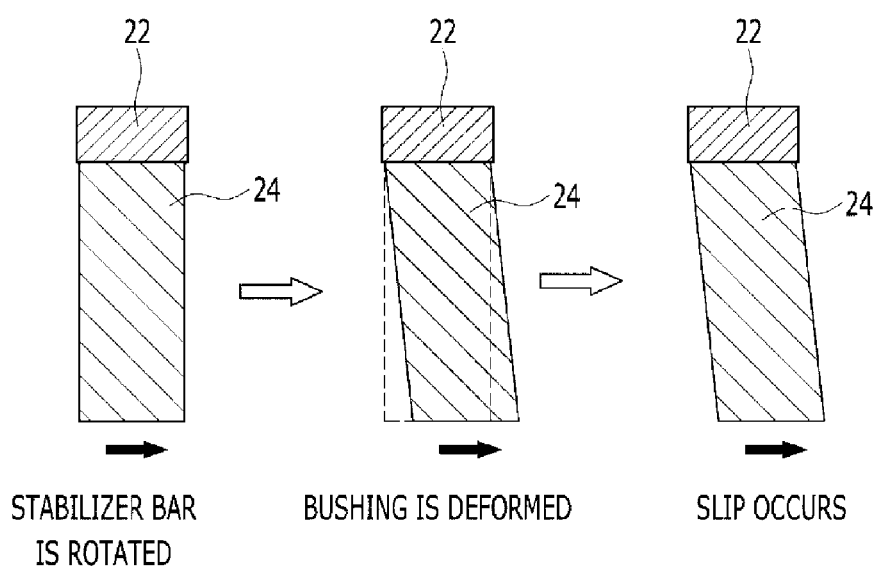
Figure 3A:
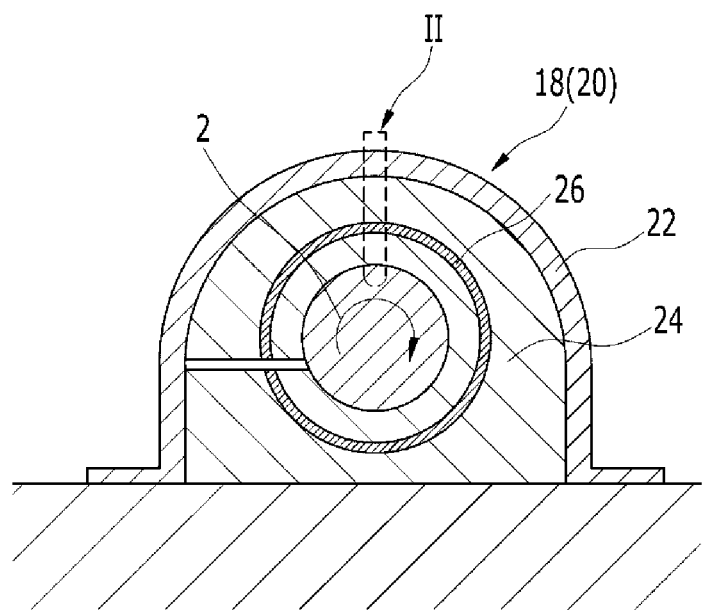
FIG. 3A and FIG. 3B are a cross-sectional view of another exemplary conventional mount bushing of a stabilizer bar and a cross-sectional view for explaining development of minute deformation.
Figure 3B:
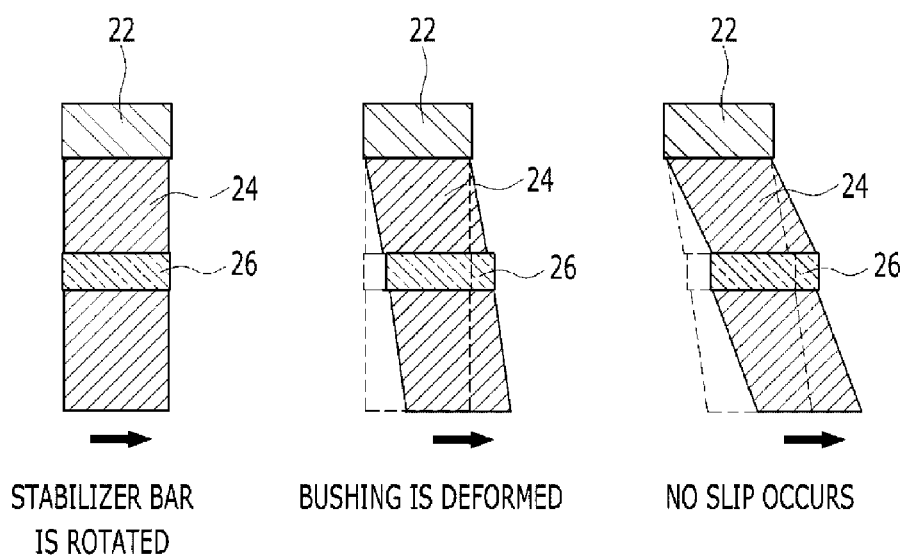

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components which are not necessary for explaining the present invention will be omitted, and the same constituent elements are denoted by the same reference numerals in this specification.

In the detailed description, ordinal numbers are used for distinguishing constituent elements having the same terms, and have no specific meanings.

Figure 4:
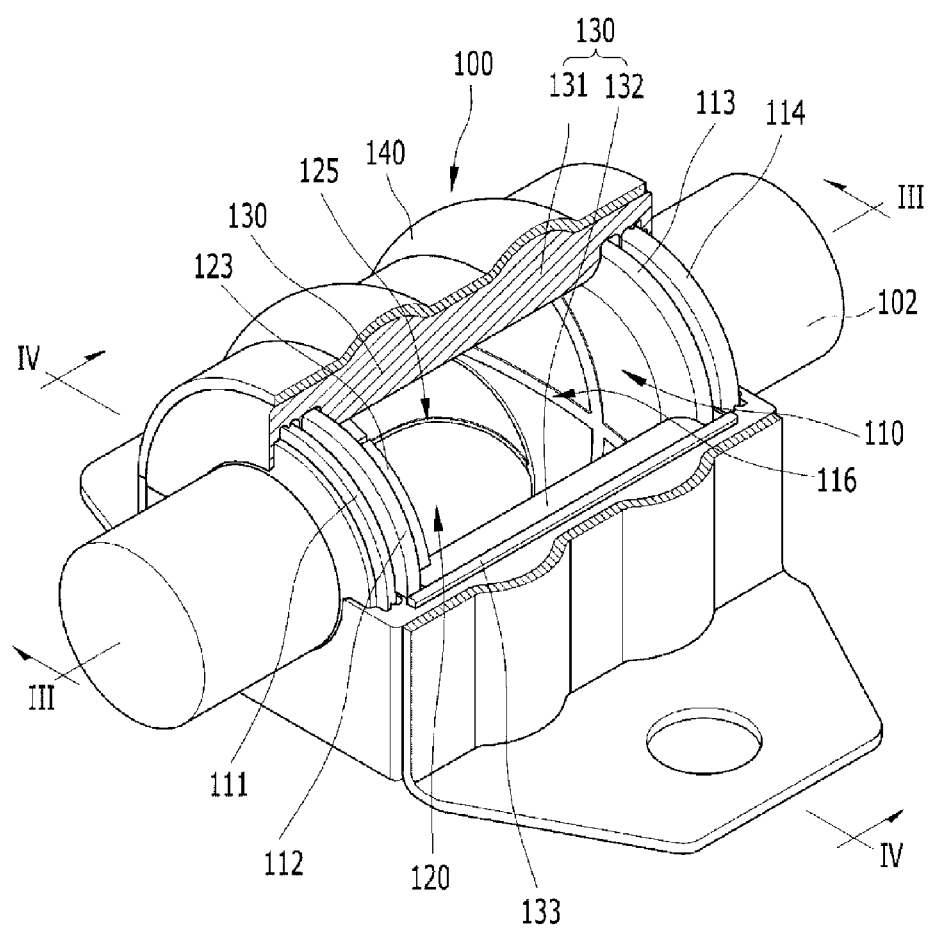
FIG. 4 is a perspective view of an exemplary mount bushing according to the present invention that is partially cut-out.
Figure 5:
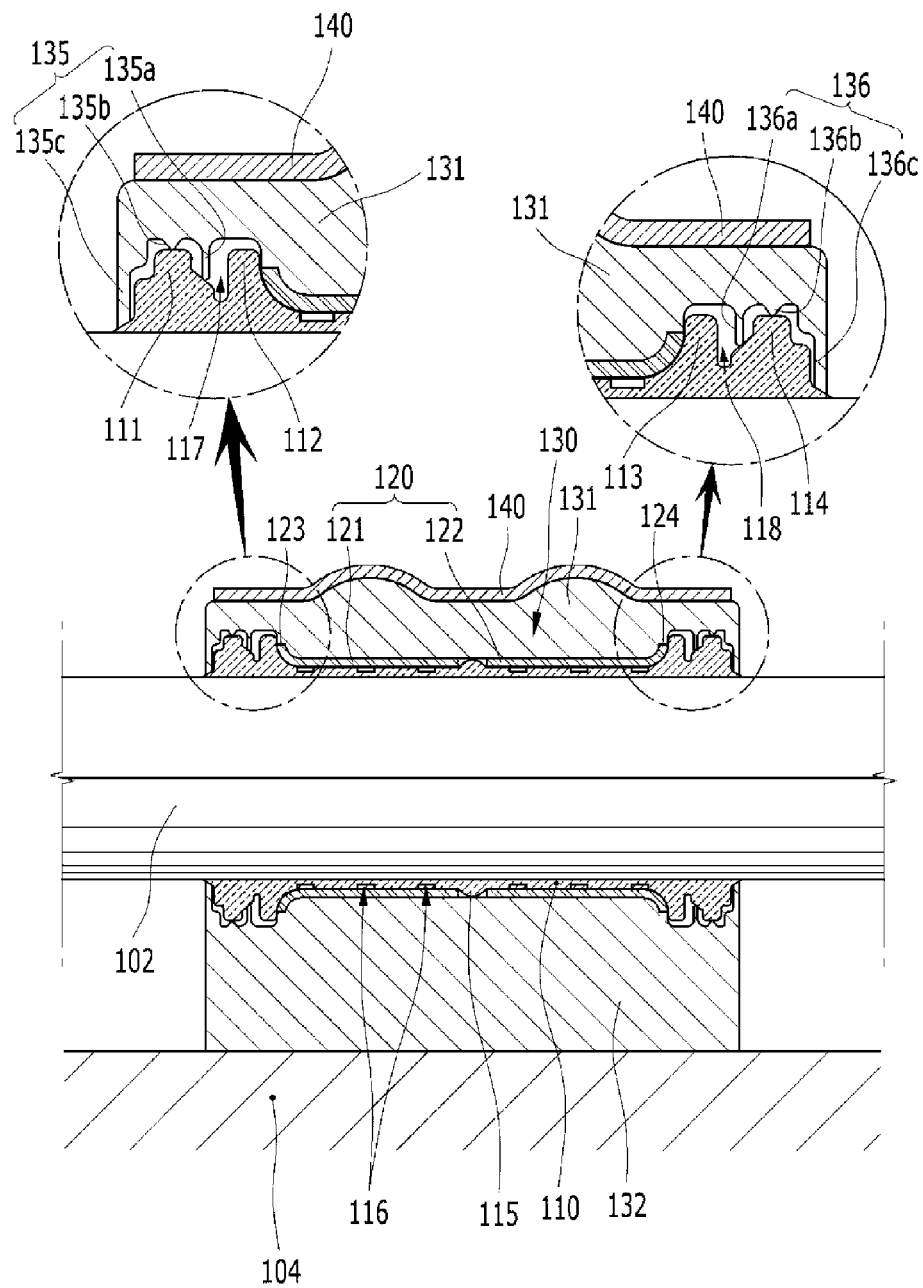
FIG. 5 is a cross-sectional view taken along the line III-III in FIG. 4.
Figure 6:
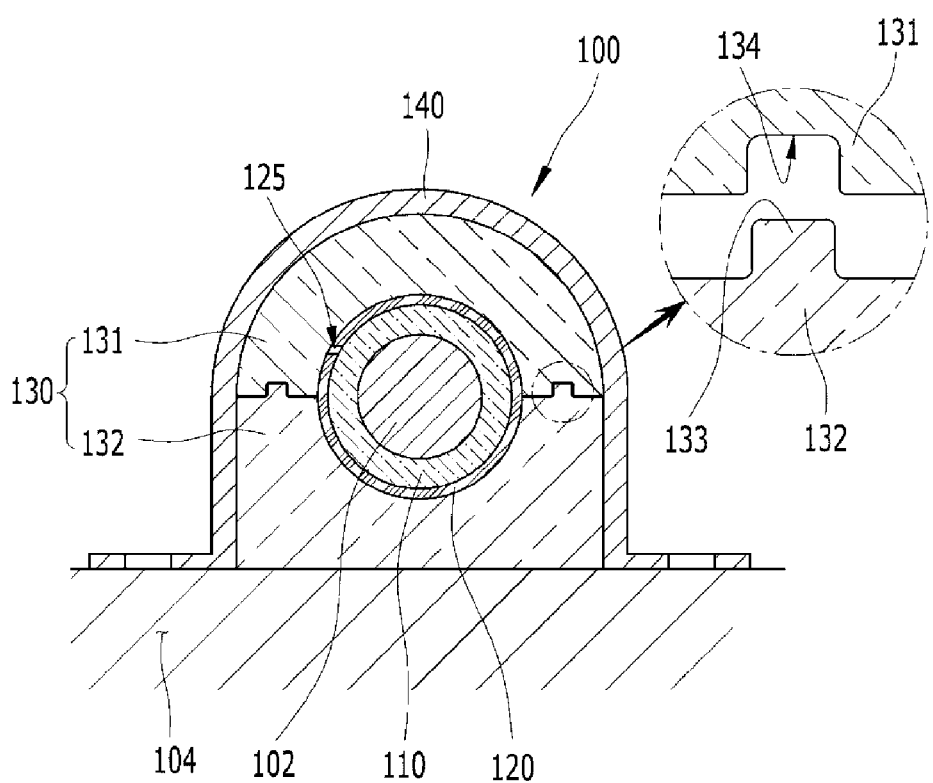
FIG. 6 is a cross-sectional view taken along the line IV-IV in FIG. 4.

FIG. 4 to FIG. 6 are drawings that illustrate a mount bushing of a stabilizer bar according to various embodiments of the present invention. In the drawings, reference numeral 100 designates an overall mount bushing.

The mount bushing 100, as shown in FIG. 4 and FIG. 5, includes an insert 110, a sliding bearing 120, a rubber bushing 130, and a bracket 140.

The insert 110 has a cylindrical shape and is made of plastic material. The insert 110 is directly molded to a predetermined position of an exterior circumference of the stabilizer bar 102.

Two large diameter flanges 111, 112, 113, and 114 are formed respectively at both end portions of the insert 110, and a circumferential mound 115 is formed at an exterior circumference of a middle portion of the insert 110. The circumferential mound 115 is adapted to support the sliding bearing 120.

In addition, a lubrication groove 116 having predetermined width and depth is formed at the exterior circumference of the insert 110 surface-contacting with an interior circumference of the sliding bearing 120, and the lubrication groove 116 is filled with a grease that is a lubricant.

The sliding bearing 120 minimizes friction between the insert 110 and the rubber bushing 130.

Therefore, the sliding bearing 120 is made of low-friction material of Teflon family (BI-MESH: Teflon+copper mesh).

The low-friction material of Teflon family is light and has great ease of assembly, high load-carrying capacity, low friction coefficient, low coefficient of thermal expansion, low thermal conductivity, enhanced formability, and enhanced chemical resistance.

The sliding bearing 120 includes a pair of bearings 121 and 122 disposed at both sides of the insert 110. The pair of bearings 121 and 122 is disposed at both sides with respect to the circumferential mound 115 of the insert 110.

Small diameter flanges 123 and 124 that have smaller diameters than the flange 112 and 113 of the insert 110 are formed at both end portions of the sliding bearing 120 so as to fix the rubber bushing 130.

In addition, each of the left and right bearings 121 and 122 included in the sliding bearing 120 is provided with a cut-out section 125 formed along a length direction thereof. Therefore, after the left and right bearings 121 and 122 are positioned at the external circumference of the insert 110 by spreading the cut-out section 125, the cut-out section 125 is closed so as to mount the left and right bearings 121 and 122 at the exterior circumference of the insert 110. Therefore, the sliding bearing 120 is adapted to be easily mounted on the insert 110.

The rubber bushing 130 disposed at an external circumference of the sliding bearing 120 includes upper and lower rubber members 131 and 132, is made of resilient material, and encloses the sliding bearing 120.

In addition, the upper and lower rubber members 131 and 132 forming the rubber bushing 130 is provided with first sealing means shown in FIG. 5 and second sealing means shown in FIG. 6 so as to prevent foreign materials from flowing into and prevent a grease from flowing out.

Referring to FIG. 5, the first sealing means are mounted at both sides of the rubber bushing 130 and are adapted to prevent the foreign materials from flowing into the rubber bushing 130 and to prevent the grease from flowing out from the rubber bushing 130. The first sealing means include lips 135 and 136 formed at both ends of interior circumferences of the upper and lower rubber members 131 and 132.

The lips 135 and 136 have circumferential mound shapes protruded from the rubber bushing 130 toward the inner and outer flanges 111, 112, 113, and 114 so as to closely contact with the inner and outer flanges 111, 112, 113, and 114 of the insert 110.

The lips 135 and 136 include first, second, and third lips 135a, 135b 135c, 136a, 136b, and 136c respectively, and lengths of the first, second, and third lips 135a, 135b, 135c, 136a, 136b, and 136c are different from each other.

Each of the first lip 135a and 136a closely contacts with an interior surface of a circumferential groove 117 and 118 formed between the inner and outer flanges 111, 112, 113, and 114, and performs a first sealing operation.

Each of the second lip 135b and 136b closely contacts with an exterior circumference of the outer flange 111 and 114 and performs a second sealing operation.

Each of the third lip 135c and 136c closely contacts with one of both ends of the insert 110 and performs a third sealing operation.

The first sealing means use three lips so as to enhance sealing effects between the insert 110 and both end portions of the rubber bushing 130.

Referring to FIG. 6, the second sealing means prevents inflow of the foreign materials and leakage of the grease between the upper and lower rubber members 131 and 132 forming the rubber bushing 130, and includes a sealing protrusion 133 and a sealing groove 134.

The sealing protrusion 133 is protruded from an upper assembling surface of the lower rubber member 132 of the rubber bushing 130 along a length direction.

The sealing groove 134 is formed at a lower assembling surface of the upper rubber member 131 of the rubber bushing 130 so as to receive the sealing protrusion 133.

Therefore, flowing the foreign materials into the upper and lower rubber members 131 and 132 or leakage of the grease from the upper and lower rubber members 131 and 132 are prevented by inserting the sealing protrusion 133 into the sealing groove 134 when the upper and lower rubber members 131 and 132 are coupled.

It is exemplified in various embodiments of the present invention that the sealing protrusion 133 is formed at the lower rubber member 132 and the sealing groove 134 is formed at the upper rubber member 131, but is not limited. That is, the sealing protrusion 133 is formed at the upper rubber member 131 and the sealing groove 134 is formed at the lower rubber member 132 in various embodiments.

The bracket 140 is shaped so as to enclose an exterior circumference of the rubber bushing 130 except a lower surface thereof that is contacted with the vehicle body or the sub frame 104, and is fixed to the vehicle body, that is, the sub frame 104.

As shown in FIG. 5, a convex portion is formed at a portion of an exterior circumference of the rubber bushing 130, and the bracket 140 is formed so as to correspond to the convex portion. Therefore, fixing strength of the rubber bushing 130 and the bracket 140 is strengthened.

The mount bushing 100, as shown in FIG. 4 and FIG. 6, fixes the stabilizer bar 102 to the sub frame 104.

Because the insert 110 is directly molded to the stabilizer bar 102 according to various embodiments of the present invention, separation of the stabilizer bar 102 is prevented and separation of the sliding bearing 120 is prevented due to the circumferential mound 115 positioned at the middle portion of the insert 110.

Because the grease that is the lubricant is located between the insert 110 and the sliding bearing 120, friction between the insert 110 and the sliding bearing 120 may be minimized, starting torque region may be minimized, and occurrence of noise may be prevented.

Because the sliding bearing 120 includes the left and right bearings 121 and 122 and the left and right bearings 121 and 122 can be spread by the cut-out section 125, management of tolerance may be facilitated and ease of assembly may be improved.

Because the first and second sealing means are formed at the rubber bushing 130, inflow of the foreign materials into the rubber bushing 130 or leakage of the grease from the rubber bushing 130 may be prevented. Therefore, durability may be improved.

In addition, thickness of the rubber bushing 130 can be reduced due to enhanced durability. Therefore, hardening according to aging of the rubber bushing 130 may be minimized and occurrence of noise may be prevented.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A mount bushing of a stabilizer bar for a vehicle, comprising:
    an insert adapted to be directly molded to a predetermined position of the stabilizer bar;
    a sliding bearing comprising a pair of bearings and adapted to be coupled to an exterior circumferential surface of the insert, a lubrication layer being formed between the insert and the sliding bearing;
    a rubber bushing comprising upper and lower rubber members and adapted to be coupled to the sliding bearing such that the rubber bushing encloses an exterior circumferential surface of the sliding bearing;
    a bracket adapted to enclose the rubber bushing and to be fixed to a vehicle body; and
    first and second sealing means adapted to prevent foreign materials from flowing into the rubber bushing and to prevent grease in the rubber bushing from flowing out;
    wherein the insert is directly molded to an exterior circumferential surface of the stabilizer bar, and is provided with inner and outer flanges of large diameter formed respectively at both ends thereof;

wherein the insert includes a circumferential ridge extending around and protruding from a middle portion of an exterior circumferential surface of the insert; and wherein the insert includes lubrication grooves recessed in the exterior circumferential surface of the insert on opposing sides of the circumferential ridge.

2. The mount bushing of claim 1, wherein the sliding bearing is made of low-friction material of Polytetrafluoroethylene.

3. The mount bushing of claim 1, wherein the sliding bearing comprises a pair of bearings, is disposed at both sides with respect to the circumferential ridge of the insert, and is provide with flanges for fixing the rubber bushing formed at both end portions of the sliding bearing.

4. The mount bushing of claim 3, wherein each of the bearings further comprises a cut-out section formed along a length direction thereof such that each of the bearings are mounted on the insert by spreading the cut-out section.

5. The mount bushing of claim 1, wherein the first sealing means comprise three lips respectively formed at interior circumferences of both sides of the rubber bushing.

6. The mount bushing of claim 5, wherein the lips have circumferential ridge shapes protruded so as to closely contact with inner and outer flanges formed at the both ends of the insert.

7. The mount bushing of claim 6, wherein the three lips comprise:
    a first lip closely contacting with an interior surface of a circumferential groove formed between the inner and outer flanges and adapted to perform a first sealing operation;
    a second lip closely contacting with an exterior circumference of the outer flange and adapted to perform a second sealing operation; and
    a third lip closely contacting with both ends of the insert and adapted to perform a third sealing operation.

8. The mount bushing of claim 1, wherein the second sealing means comprises:
    a sealing protrusion formed at one of the upper and lower rubber members; and
    a sealing groove corresponding to the sealing protrusion and formed at the other of the upper and lower rubber members.

9. The mount bushing of claim 8, wherein the sealing protrusion is protruded from an upper assembling surface of the lower rubber member along a length direction thereof, and the sealing groove is formed at a lower assembling surface of the upper rubber member and is adapted to receive the sealing protrusion.

\* \* \* \* \*